(12) United States Patent  
Weilant

(10) Patent No.: US 7,395,910 B2
(45) Date of Patent: Jul. 8, 2008

(54) CLUTCH WITH ADJUSTABLE PACK CLEARANCE

(75) Inventor: David R. Weilant, Muncie, IN (US)

(73) Assignee: BorgWarner Inc., Auburn Hills, MI (US)

(*) Notice: Subject to any disclaimer, the term of this patent is extended or adjusted under 35 U.S.C. 154(b) by 308 days.

(21) Appl. No.: 11/244,843

(22) Filed: Oct. 6, 2005

(65) Prior Publication Data

US 2006/0081438 A1 Apr. 20, 2006

Related U.S. Application Data

(60) Provisional application No. 60/618,883, filed on Oct. 14, 2004.

(51) Int. Cl.
*F16D 27/115* (2006.01)
*F16D 13/75* (2006.01)
(52) U.S. Cl. ............... 192/84.7; 192/84.91; 192/110 R
(58) Field of Classification Search ............... 192/84.7, 192/84.5
See application file for complete search history.

(56) References Cited

U.S. PATENT DOCUMENTS 2,933,171 A * 4/1960 Kraeplin ............... 192/84.7
2,965,207 A 12/1960 Snyder
4,399,894 A 8/1983 Tribe
5,234,090 A 8/1993 Haka
5,407,024 A * 4/1995 Watson et al. ............... 180/248
5,749,451 A 5/1998 Grochowski
5,842,549 A 12/1998 Hall, III
5,957,246 A 9/1999 Suzuki
6,367,591 B1 4/2002 Gosda

* cited by examiner

Primary Examiner—Rodney H Bonck
(74) Attorney, Agent, or Firm—Warn Partners, P.C.

(57) ABSTRACT

The present invention allows for the pack clearance of a clutch pack to be adjusted during the manufacturing process to the proper amount, even if there are variations in friction disc thickness and steel disc thickness. The present invention is an electromagnetic clutch having an adjustable pack clearance arrangement, comprising an output shaft, a pressure plate, and a clutch pack actuated by the pressure plate. The pressure plate and the clutch pack are splined to the output shaft. There is also a clutch housing splined to the clutch pack, which also receives force from the clutch pack when the pressure plate is applied. The pressure plate defines a pack clearance for the clutch pack, and the pack clearance is adjustable by a pack clearance adjusting arrangement.

17 Claims, 5 Drawing Sheets

CLUTCH WITH ADJUSTABLE PACK CLEARANCE

CROSS-REFERENCE TO RELATED APPLICATIONS

This application claims the benefit of U.S. Provisional Application No. 60/618,883, filed Oct. 14, 2004. The disclosure of which is incorporated herein by reference.

FIELD OF THE INVENTION

The present invention relates to the adjustment of pack clearance in a clutch pack used in various automotive applications.

BACKGROUND OF THE INVENTION

Wet clutch friction systems are widely used in the field of automatic transmissions and transfer cases. Most clutches use several friction discs interleaved with several steel discs to provide torque transfer upon frictional engagement. This type of configuration is also used in braking applications. The frictional engagement is achieved through a piston disposed in a housing to enforce the frictional engagement between the friction discs and steel discs. The piston travels linearly in a cavity in a housing between an engaged (e.g. when pressure is applied) and a disengaged position (e.g. when the pressure is released and the return springs move the piston back). The amount of travel between the engaged and disengaged positions is often termed the pack clearance or "running" clearance.

When the pack is not engaged, the clearance allows for spacing between the friction disc elements interleaved with the steel disc elements. This serves two purposes, the first is to allow the friction disc elements to rotate independently from the steel disc elements, and the second is for the reduction of spin losses within the transmission. When there is not enough clearance between the separate elements, spin losses can result in drag torque. This reduces the efficiency of the transmission (or transfer case), and can also affect fuel economy. The pack clearance also has an effect on engagement time; the piston must travel the length of the pack clearance before the pack is fully engaged and full torque transfer occurs. A large pack clearance will lead to a longer engagement time, which can also affect the performance of the transmission or transfer case, depending on where the clutch is used. As transmissions and transfer cases improve in technology, reduced shift times are considered desirable.

One problem that occurs often in the manufacturing process is the variability of the thickness that can occur in the friction discs and steel discs that are used in a clutch pack. These variations in thickness in both of these elements can cause variations in running clearance once the clutch pack is assembled, affecting shift time, and spin loss characteristics. Typically, pack clearance adjustment is achieved through the use of shims. The shims take up extra space in the clutch pack so the apply piston travels a controlled distance to engage the pack.

SUMMARY OF THE INVENTION

The present invention allows for the pack clearance to be adjusted during the manufacturing process to a specified amount, even if there are variations in friction disc thickness and steel disc thickness. The present invention is an electromagnetic clutch having an adjustable pack clearance arrangement, comprising an output shaft, a pressure plate, and a clutch pack actuated by the pressure plate. The pressure plate and the clutch pack are splined to the output shaft. There is also a clutch housing splined to the clutch pack, which also receives force from the clutch pack when the pressure plate is applied. Axial movement of the pressure plate defines a pack clearance for the clutch pack, and the pack clearance is adjustable by a pack clearance adjusting arrangement.

The pack clearance adjusting arrangement comprises in a first embodiment a base cam having a threaded inner surface supported by bearings on the output shaft. The base cam is screwed onto the threaded plate. Upon rotation of the threaded plate in a clockwise or counterclockwise direction, the base cam will translate axially along the output shaft, changing the pack clearance of the clutch pack.

The pack clearance adjusting arrangement comprises in a second embodiment the pressure plate having two elements, the first element featuring a series of adjustment stops, and the second element featuring a series of corresponding recesses for receiving the adjustment stops. Upon indexing the first element relative to the second element, a displacement occurs between the two elements, adjusting the pack clearance.

The pack clearance adjusting arrangement comprises in a third embodiment a cam plate having a helical ramp surface on a first side, and the pressure plate having a helical ramp surface that contacts the helical ramp surface of the cam plate. The cam plate can be indexed on the output shaft so the helical ramp surface moves the pressure plate to either increase or decrease pack clearance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
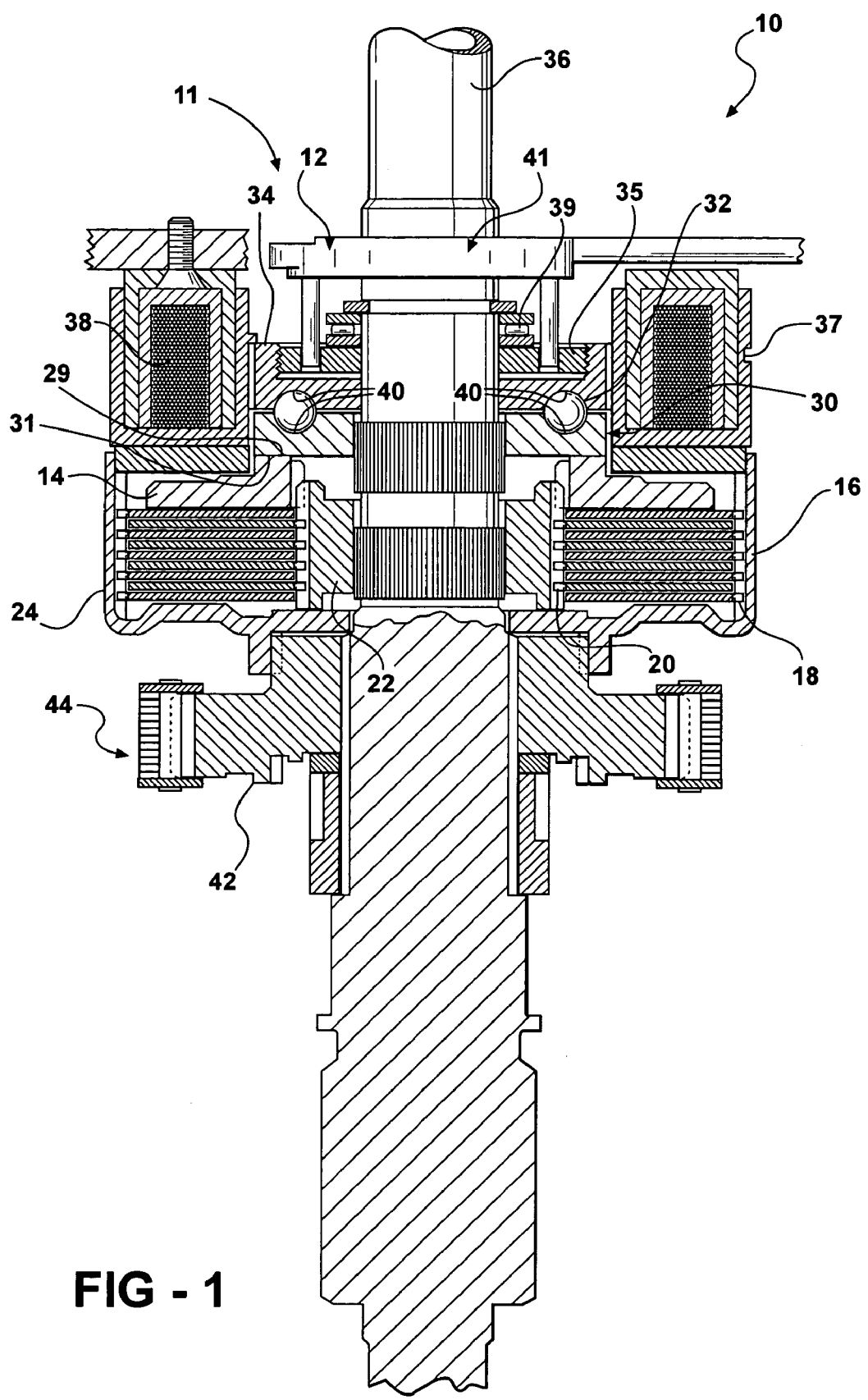
FIG. 1 is a cross-sectional view of a first preferred embodiment of the present invention wherein the base cam is screwed onto a threaded ring, which is not splined to the shaft, and the clearance is dialed in with a spanner wrench.
Figure 2:
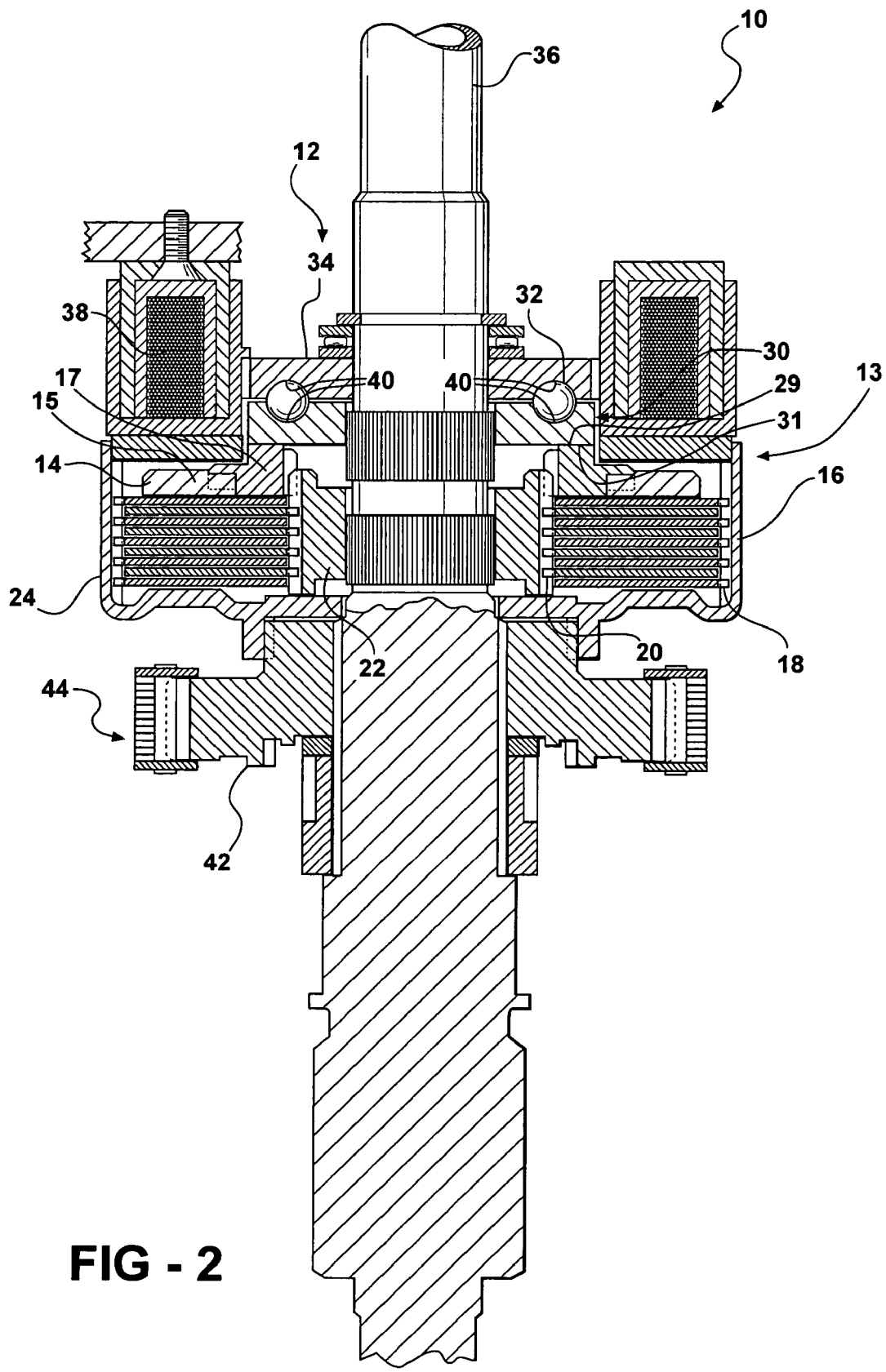
FIG. 2 is a cross-sectional view of a second embodiment of the present invention wherein the pressure plate is comprised of two elements, each having recesses of variable depth, which upon indexing, adjust the pack clearance.
Figure 3:
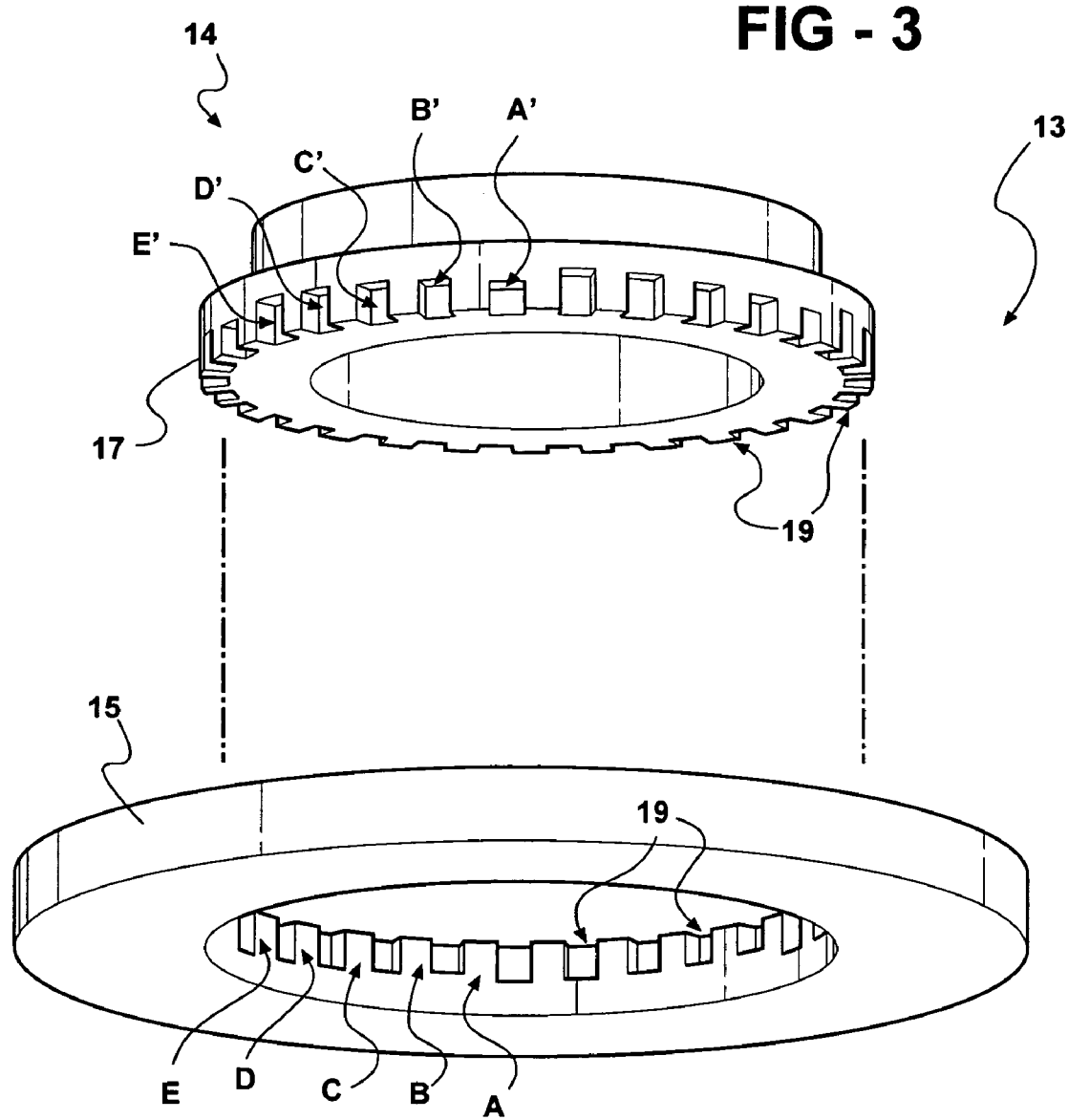
FIG. 3 is an exploded perspective view of the pressure plate according to the second embodiment of the present invention.
Figure 4:
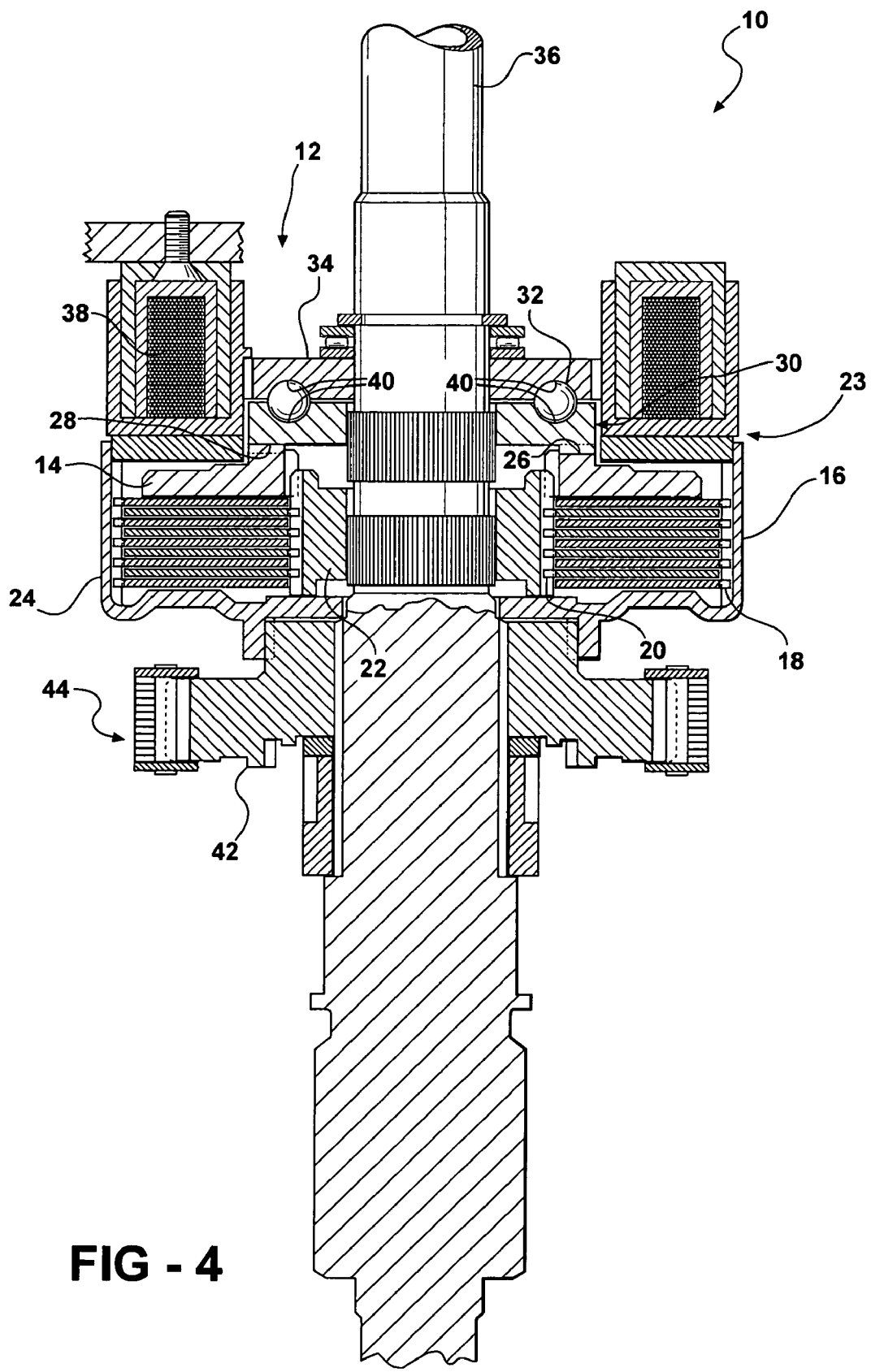
FIG. 4 is a cross-sectional view of a third embodiment of the present invention wherein the cam plate is indexed on the output shaft to adjust the pack clearance.

FIGS. 1, 3, and 4, depict an electromagnetic clutch or clutch assembly 10 having a ball ramp assembly 12, a pressure plate 14, and a clutch pack 16 incorporated in a transfer case of a vehicle driveline. It is envisioned that the embodiments of the invention shown in FIGS. 1-4a could be incorporated in other areas where clutches are used. For example, this invention could be used in both manual and automatic transmissions as well as in axle differentials. It is also possible to use the present invention in other areas where clearance must be indexed during assembly. For example, in vehicle brake systems it is necessary to set the degree of travel for a piston in a disc brake. The adjustable cams described herein can be used for that purpose.

The clutch pack 16 is comprised of interleaved friction discs 20, which are splined to hub 22, and steel discs 18, which are splined to housing 24. When the clutch pack is disengaged, the steel discs 18 and the friction discs 20 can rotate independently of each other. As shown in FIG. 1, the pressure plate 14, which applies the clutch pack 16, has a surface 31 that rests against surface 29 of the cam plate 30. The clutch housing 24 is splined to the steel discs 18, and is also connected to sprocket 42. The sprocket 42 is partially circumscribed by chain 44. The chain 44 also circumscribes another sprocket (not shown) which delivers power to a set of wheels.

The ball ramp assembly 12 is comprised of cam plate 30, balls 32, base cam 34, and electromagnet 38. The cam plate 30 is splined to primary output shaft 36, and the base cam 34 is not splined to the output shaft 36, but rather rotates independently. Both the cam plate 30 and the base cam 34 have cam surfaces 40 which hold balls 32. Under normal operation, to engage the clutch pack 16, the electromagnet 38 is activated, causing relative motion between the cam plate 30 and the base cam 34. As this occurs, the balls 32 roll up the ramp portions of the cam 40 on the cam plate 30 and base cam 34. This causes the base cam 34 and the cam plate 30 to separate. As the cam plate 30 is pushed away from the base cam 34, it forces the pressure plate 14 to apply the clutch pack 16. Once the clutch pack 16 is applied, torque is transferred through the primary output shaft 36, through the ball ramp 12, then through the clutch pack 16, through housing 24, through sprocket 42, and finally through chain 44. The chain is connected to another sprocket which is connected to another output shaft (not shown).

During actuation, the pressure plate 14 travels from its disengaged position to its fully actuated position. The distance the pressure plate 14 travels is known as the pack clearance, or "running" clearance. The pack clearance is necessary for proper spacing to exist between the interleaved steel discs 18 and friction discs 20 when the clutch pack 16 is not engaged. This spacing is necessary to reduce or eliminate spin loss, and to prevent premature wear of the frictions discs 20.

A pack clearance adjusting arrangement 11 shown in FIG. 1 has a base cam 34 having an inner threaded surface, which is screwed onto a threaded plate 35. Threaded plate 35 is not splined to primary output shaft 36, instead, it rests against bearing 39, so as to rotate independent from the primary output shaft 36. The pack clearance can be adjusted using spanner wrench 41. As the spanner wrench 41 is used to rotate threaded plate 35, the base cam 34 will move in an axial direction, either closer or further away from the pressure plate 14, depending on which direction the threaded plate 35 is turned. The base cam 34 also has a recess 37 which receives an indexing tool for holding the base cam 34 in place while the threaded plate 35 is rotated. Moving the base cam 34 will cause the entire ball ramp assembly 12 to move in an axial direction, along with the pressure plate 14. Moving the pressure plate 14 in an axial direction will change the pack clearance. This embodiment allows for the pack clearance to be adjusted once the clutch pack 16 and ball ramp assembly 12 have already been assembled, and also spans the entire system tolerance.

A pack clearance adjusting arrangement 13 is shown in FIGS. 2-3 having the pressure plate 14 as two separate elements; the first element 15 includes a series of first adjustment stops A, B, C, D, and E, which as a series, repeat around the inner circumference of first element 15. Each adjustment stop is of a different length relative to one another; the stops get longer progressively, beginning with A being the shortest, and E being the longest. The series of first adjustment stops A, B, C, D, and E rest against corresponding recesses A', B', C', D', and E' respectively in second element 17. The corresponding recesses A', B', C', D' and E' also repeat as a series around the outer circumference of second element 17, and are of different depths suited for receiving said adjustment stops of first element 15. The first element 15 rests against the clutch pack 16, and the second element 17, rests against the cam plate 30. As the second element 17 is indexed during assembly relative to first element 15, the first adjustment stops A, B, C, D, and E become offset with corresponding recesses A', B', C', D', and E'. The indexing of the elements relative to one another changes the axial position of the first element 15 relative to the second element 17, thus changing the pack clearance of the clutch pack 16. The amount of change in the pack clearance depends on how the first element 15 and second element 17 are indexed relative to one another, because of the varying depths of the adjustment stops. In this embodiment, the base cam 34 is one component, and the pressure plate 14 and cam plate 30 have the same surfaces 29 and 31 respectively, as shown in FIG. 1.

Figure 4A:
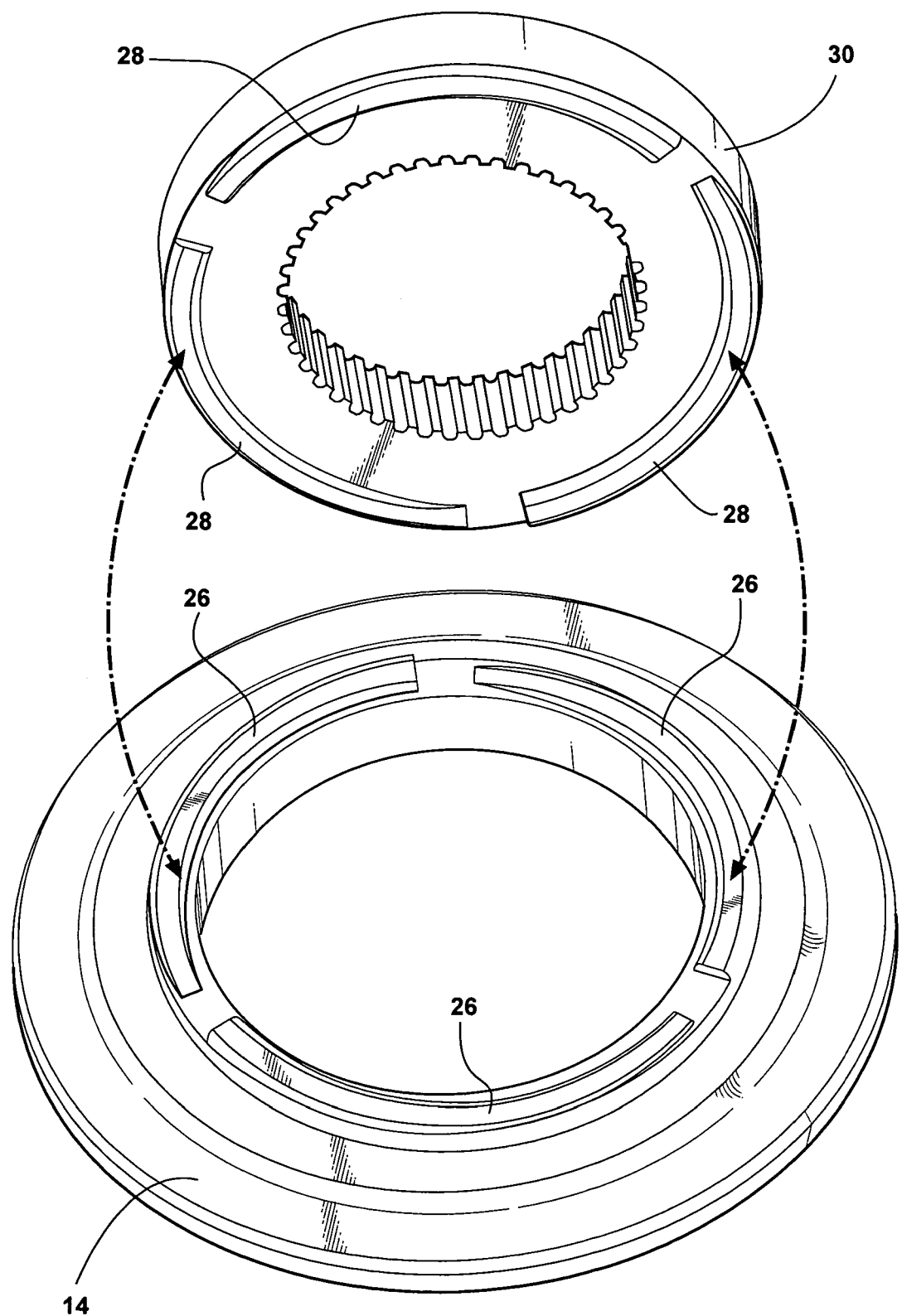
FIG. 4a is an isometric view of the cam surface one the pressure plate.

A third embodiment of a pack clearance adjusting arrangement 19 is shown in FIGS. 4 and 4a where the pressure plate 14, which applies the clutch pack 16, has a helical surface 28, which engages a helical surface 26 on the cam plate 30.

The pack clearance can be adjusted when the ball ramp 12 is being assembled during the manufacturing process by indexing the cam plate 30 on the primary output shaft 36. The helical surface 28 on the cam plate 30 is engaged with the helical surface 26 on the pressure plate 14. As the cam plate 30 is indexed, the helical surface 28 on the cam plate 30 is also indexed. This changes the position of the pressure plate 14 relative to the cam plate 30, as well as the clutch pack 16. The cam plate 30 can be indexed so that the pressure plate 14 is moved closer or further away from the clutch pack 16, either increasing or decreasing the pack clearance. The indexing of the cam plate 30 causes an incremental change in the pack clearance, the incremental change in the clearance is based on the number of the splines on primary output shaft 36. Many splines allow for the cam plate to be indexed in smaller increments, allowing for a more finite range of pack clearance possibilities. Having the ability to adjust the pack clearance allows for compensation of the variations in thickness that can occur in the manufacturing of the friction discs 20 and the steel discs 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic clutch assembly having an adjustable pack clearance arrangement, comprising:
    an output shaft;
    a pressure plate;

a clutch pack at a first side engageable with said pressure plate, wherein said pressure plate and clutch pack are splined to said output shaft;

a clutch housing splined to said clutch pack, engageable with said clutch pack on a second side, wherein said pressure plate defines a pack clearance for said clutch pack;

a base cam having a threaded inner surface engaged with a threaded plate, said threaded plate supported by bearings on said output shaft; and wherein upon rotation of said threaded plate in a clockwise or counterclockwise direction, said base cam will translate axially along said output shaft, changing the pack clearance of said clutch pack.

2. An electromagnetic clutch assembly having an adjustable pack clearance arrangement, comprising:

an output shaft;

a pressure plate;

a clutch pack at a first side engageable with said pressure plate, wherein said pressure plate and clutch pack are splined to said output shaft;

a clutch housing splined to said clutch pack, engageable with said clutch pack on a second side, wherein said pressure plate defines a pack clearance for said clutch pack;

said pressure plate having a first element featuring a series of adjustment stops; and said pressure plate having a second element featuring a series of corresponding recesses for receiving said adjustment stops, wherein upon which indexing said first element relative to said second element, a displacement occurs between said first element and said second element, adjusting the pack clearance.

3. An electromagnetic clutch assembly having an adjustable pack clearance arrangement, comprising:

an output shaft;

a pressure plate;

a clutch pack at a first side engageable with said pressure plate, wherein said pressure plate and clutch pack are splined to said output shaft;

a clutch housing splined to said clutch pack, engageable with said clutch pack on a second side, wherein said pressure plate defines a pack clearance for said clutch pack;

a cam plate having a helical ramp surface on a first side; and said pressure plate having a helical ramp surface that contacts said helical ramp of said cam plate, wherein said cam plate can be indexed on said output shaft so said helical ramp moves said pressure plate to either increase or decrease said pack clearance.

4. An electromagnetic clutch assembly having a variable pack clearance, comprising:

an output shaft;

a clutch pack positioned on said output shaft, having a pressure plate;

a ball ramp assembly operably associated with said output shaft having a base cam and a cam plate, said base cam having one or more cam surfaces on a first side, and said cam plate having one or more cam surfaces on a first side, and a second side resting against said pressure plate;

one or more balls held in position by said cam surfaces of said base cam and said cam plate, in which said base cam and said cam plate will axially displace apart along said output shaft upon relative motion therebetween said base cam and said cam plate, causing pressure to be applied to said pressure plate, engaging said clutch pack;

said base cam having a threaded inner surface;

a threaded plate supported by bearings on said output shaft; and said base cam being threaded onto said threaded plate, wherein upon rotation of said threaded plate, said base cam will translate axially along said output shaft, causing said pack clearance of said clutch pack to increase or decrease.

5. An electromagnetic clutch assembly having a variable pack clearance, comprising:

an output shaft;

a clutch pack positioned on said output shaft, having a pressure plate;

a ball ramp assembly operably associated with said output shaft having a base cam and a cam plate, said base cam having one or more cam surfaces on a first side, and said cam plate having one or more cam surfaces on a first side, and a second side resting against said pressure plate;

one or more balls held in position by said cam surfaces of said base cam and said cam plate, in which said base cam and said cam plate will axially displace apart along said output shaft upon relative motion therebetween said base cam and said cam plate, causing pressure to be applied to said pressure plate, engaging said clutch pack;

a first element of said pressure plate having a set of adjustment stops; and a second element of said pressure plate having a set of corresponding recesses for receiving said adjustment stops, wherein indexing said first element relative to said second element causes axial displacement to occur between said first element and said second element, adjusting said pack clearance.

6. An electromagnetic clutch assembly having a variable pack clearance, comprising:

an output shaft;

a clutch pack positioned on said output shaft, having a pressure plate;

a ball ramp assembly operably associated with said output shaft having a base cam and a cam plate, said base cam having one or more cam surfaces on a first side, and said cam plate having one or more cam surfaces on a first side, and a second side resting against said pressure plate;

one or more balls held in position by said cam surfaces of said base cam and said cam plate, in which said base cam and said cam plate will axially displace apart along said output shaft upon relative motion therebetween said base cam and said cam plate, causing pressure to be applied to said pressure plate, engaging said clutch pack;

said cam plate having a helical ramp surface; and said pressure plate having a helical ramp surface which contacts said helical ramp surface of said cam plate, wherein upon indexing said cam plate on said output shaft, said pressure plate will translate axially along said output shaft causing displacement to occur between said cam plate and said pressure plate, adjusting said pack clearance.

7. A clutch assembly having an adjustable pack clearance, comprising:

a clutch pack mounted on an output shaft;

a pressure plate for applying said clutch pack;

a cam plate splined to said output shaft having a first side with one or more cam surfaces and a second side in contact with said pressure plate;

a base cam free to rotate upon said output shaft, having one or more cam surfaces on a first side which are complementary to said cam surfaces on said cam plate, wherein said first side of said cam surfaces are operably engageable to said one or more cam surfaces of said cam plate when said clutch assembly is engaged, and relative rotation of said base cam in relation to said cam plate will cause axial displacement of said cam plate, and said pressure plate, applying said clutch pack; and a threaded plate resting against a bearing mounted on said output shaft and said base cam having a threaded inner surface threaded onto said threaded plate.

8. The pack clearance adjusting arrangement of claim 7, wherein translating said base cam in an axial direction by rotating said base cam on said threaded plate will adjust said pack clearance of said clutch pack.

9. The clutch assembly having an adjustable pack clearance of claim 7, wherein said base cam is operably engageable to said cam plate by a series of balls held in place by said one or more cam surfaces of said cam plate and said one or more surfaces of said base cam.

10. The clutch assembly having an adjustable pack clearance of claim 9, wherein said series of balls will rotate along said one or more cam surfaces of said base cam and said one or more cam surfaces of said cam plate upon relative rotation between said base cam and said cam plate.

11. A clutch assembly having an adjustable pack clearance, comprising:
a clutch pack mounted on an output shaft;
a pressure plate for applying said clutch pack;
a cam plate splined to said output shaft having a first side with one or more cam surfaces and a second side in contact with said pressure plate;
a base cam free to rotate upon said output shaft, having one or more cam surfaces on a first side which are complementary to said cam surfaces on said cam plate, wherein said first side of said cam surfaces are operably engageable to said one or more cam surfaces of said cam plate when said clutch assembly is engaged, and relative rotation of said base cam in relation to said cam plate will cause axial displacement of said cam plate, and said pressure plate, applying said clutch pack; and said pressure plate having a first element with a series of adjustment stops circumscribing the inner surface of said first element and a second element with a series of recesses circumscribing the inner surface of said second element.

12. The pack clearance adjusting arrangement of claim 11, wherein said series of recesses on said second element are used for receiving said adjustment stops of said first element.

13. The clutch pack having a pack clearance adjusting arrangement of claim 12, wherein said apparatus is comprised of said cam plate having a helical ramp surface in contact with a corresponding helical ramp surface of said pressure plate.

14. The pack clearance adjusting arrangement of claim 13, wherein upon indexing said cam plate on said output shaft, said helical ramp on said pressure plate and said helical ramp on said cam plate will cause said pressure plate to translate axially along said output shaft, adjusting said pack clearance.

15. The pack clearance adjusting arrangement of claim 11, wherein upon indexing said first element relative to said second element, said first element will translate along said output shaft relative to said second element, adjusting said pack clearance.

16. The clutch assembly having an adjustable pack clearance of claim 11, wherein said base cam is operably engageable to said cam plate by a series of balls held in place by said one or more cam surfaces of said cam plate and said one or more surfaces of said base cam.

17. The clutch assembly having an adjustable pack clearance of claim 16, wherein said series of balls will rotate along said one or more cam surfaces of said base cam and said one or more cam surfaces of said cam plate upon relative rotation between said base cam and said cam plate.

* * * * *